Patented Dec. 31, 1929

1,741,778

UNITED STATES PATENT OFFICE

PAUL C. JONES, OF CUYAHOGA FALLS, OHIO, ASSIGNOR TO THE B. F. GOODRICH COMPANY, OF NEW YORK, N. Y., A CORPORATION OF NEW YORK

RUBBER COMPOSITION AND METHOD OF PRESERVING RUBBER

No Drawing. Application filed January 21, 1929. Serial No. 334,121.

This invention relates to the art of preserving rubber, either in a vulcanized or unvulcanized condition, and to rubber compositions so preserved.

It is well known that rubber gradually loses its strength and resiliency on aging, especially when exposed to light, air or heat, and that many reducing substances, such as organic nitrogen compounds, possess the property of retarding this deterioration. Among such compounds which have been employed with more or less success as age-resisters or anti-oxidants to retard the deterioration of rubber are: aniline, p-aminophenol, acetaldehyde-aniline, ethylaniline, and phenylhydrazine.

This invention, in brief, consists in treating rubber with a substance belonging to a new class of age-resisters, comprising tetra-substituted hydrazines. These compounds, when incorporated into rubber before vulcanization, preferably from 0.1% to 5% of the age-resister being used, are far more effective in retarding the deterioration of rubber than the previously known substances mentioned above.

The tetra-aryl hydrazines in general may be prepared by the controlled oxidation of secondary aromatic amines. For example, if the theoretical amount of potassium permanganate in acetone solution is added to a solution of diphenyamine in acetone, the diphenylamine is oxidized to tetraphenyl hydrazine according to the following equation:

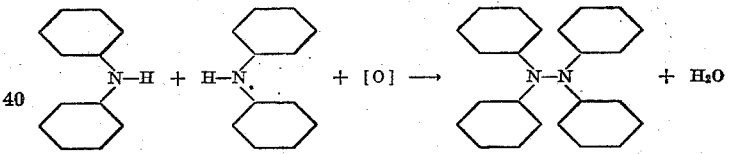

The manganese dioxide which is formed simultaneously is filtered off and the acetone evaporated. If desired the crude product may be recrystallized from alcohol. The pure tetraphenyl hydrazine is a colorless crystalline substance, but the crude product is a more or less strongly colored pasty mass.

It is not always necessary to purify the reaction product, since the by-products of the reaction are either themselves age-resisters, or are substantially inert. They have the effect of lowering the melting point and increasing the solubility of the material in rubber, which is sometimes a considerable advantage.

Other tetra-substituted hydrazines, such as tetra-benzyl hydrazine, tetra-tolyl hydrazine, tetra-hydroxy tetra-phenyl hydrazine, tetra-chlorphenyl hydrazine, tetra-(p-aminophenyl) hydrazine, dihydroxy tetraphenyl hydrazine, di-hydroxyphenyl ditolyl hydrazine, diphenyl ditolyl hydrazine, dianisyl diphenyl hydrazine, etc., may be prepared in much the same manner by oxidizing the corresponding secondary amines.

For certain purposes a mixture of two or more of these substances is very useful, since the melting point of a mixture is considerably lower than that of a pure compound. For example, if a mixture of phenyl-tolylamine and diphenylamine is oxidized, the product will contain diphenyl ditolyl hydrazine and tetraphenyl hydrazine, as well as triphenyl tolyl hydrazine. However, it is to be understood that the method of preparing the tetra-substituted hydrazines is immaterial, such products in general being excellent age-resistors in rubber.

*Example 1.*—As a specific example of one embodiment of the method of this invention, a tire tread composition was prepared containing: blended plantation rubbers 100 parts by weight, sulfur 5.5 parts, zinc oxide 30 parts, gas black 40 parts, mineral rubber 10 parts, palm oil 5 parts, and hexa-methylene tetramine 0.75 parts. This was divided into two portions, one of which was used as a control. To the other was added 0.95 parts (0.5% by weight of the composition) of tetra-phenyl hydrazine. The compositions were thoroughly mixed, and vulcanized in a press for 45 minutes at 294° F. to produce an optimum cure. The relative rates of aging of the vulcanized compositions were compared by measuring their respective tensile strengths and elongations before and after aging. Accelerated aging tests were carried out in the Geer aging oven, in which samples were maintained at a temperature of 158° F., in a constantly renewed stream of air, as well as in the Bierer-Davis bomb, in which other samples were maintained at the same temperature (158° F.) in an atmosphere of oxygen at a pressure of 300 lbs. per sq. in. In the table below T indicates ultimate tensile strength in pounds per square inch and E indicates ultimate elongation in per cent of original length.

*Aging tests of tetraphenyl hydrazine*

| Age-resister (0.5%) | Before aging | | After 7 days in the Geer oven | | After 48 hours in the Bierer-Davis bomb | |
|---|---|---|---|---|---|---|
| | T | E | T | E | T | E |
| None (control) | 3607 | 675 | 1976 | 493 | 804 | 357 |
| Tetraphenyl hydrazine | 3718 | 733 | 3389 | 580 | 2714 | 630 |

*Example 2.*—Tetrabenzyl hydrazine,

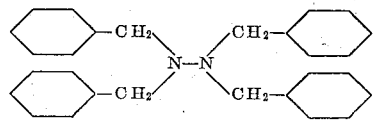

when tested in a rubber composition in the manner described in Example 1 above, gave the following aging results:

*Aging tests of tetrabenzyl hydrazine*

| Age-resister (0.5%) | Before aging | | After 7 days in the Geer oven | | After 48 hours in the Bierer-Davis bomb | |
|---|---|---|---|---|---|---|
| | T | E | T | E | T | E |
| None (control) | 3540 | 663 | 2196 | 470 | 642 | 263 |
| Tetrabenzyl hydrazine | 3405 | 670 | 2549 | 550 | 2089 | 567 |

*Example 3.*—N,N'-di-p-anisyl N,N'-diphenyl hydrazine,

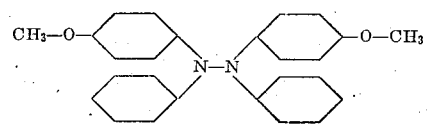

also exhibits remarkable anti-oxidant powers in rubber, as is evident from the following table:

*Aging tests of dianisyl diphenyl hydrazine*

| Age-resister (0.5%) | Before aging | | After 7 days in the Geer oven | | After 48 hours in the Bierer-Davis bomb | |
|---|---|---|---|---|---|---|
| | T | E | T | E | T | E |
| None (control) | 3540 | 663 | 2196 | 470 | 642 | 263 |
| Dianisyl diphenyl hydrazine | 3303 | 663 | 3150 | 577 | 2564 | 573 |

*Example 4.*—The effect of the tetra-substituted hydrazines is most marked when all four substituent groups comprise p-substituted benzene nuclei. For example, tetra-p-tolyl hydrazine,

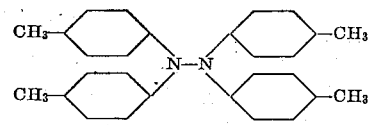

gives the following results:

*Aging tests of tetra-p-tolyl hydrazine*

| Age-resister (0.5%) | Before aging | | After 7 days in the Geer oven | | After 48 hours in the Bierer-Davis bomb | |
|---|---|---|---|---|---|---|
| | T | E | T | E | T | E |
| None (control) | 3453 | 640 | 2008 | 417 | 642 | 263 |
| Tetra-p-tolyl hydrazine | 3554 | 697 | 3262 | 570 | 2723 | 607 |

From the above data it is evident that the tetra-substituted hydrazines are excellent age-resisters in rubber. The tetra-aryl hydrazines, in particular, are so active as age-resisters that a composition containing only 0.5% undergoes substantially no deterioration when subjected to an accelerated aging test which almost completely destroys the strength of the same composition without the tetra-aryl hydrazine. However, it is to be understood that the examples are merely illustrative, and that the tetra-substituted hydrazines may be incorporated into rubber compositions of the most various nature with good effect upon their age-resisting properties. They may also be applied to unvulcanized or vulcanized rubber with good effect on the age-resisting properties of the rubber, such as by applying them to the surface of the rubber, as for example in solution, or in the form of a paste or emulsion.

It is to be understood that the term "treating" as employed in the appended claims is used in a generic sense to include either the incorporation of the age-resisters into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta percha, rubber isomers and like products, whether or not admixed with fillers, pigments, vulcanizing or accelerating agents.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

I claim:

1. The method of preserving rubber which comprises treating rubber with a tetra-substituted hydrazine.

2. The method of preserving rubber which comprises treating rubber with a tetra-substituted hydrazine, the substituent groups comprising aromatic nuclei.

3. The method of preserving rubber which comprises treating rubber with a tetra-aryl hydrazine.

4. The method of preserving rubber which comprises treating rubber with a substance selected for the class comprising tetraphenylhydrazine and substitution products thereof.

5. The method of preserving rubber which comprises treating rubber with a substance selected from the class comprising tetraphenyl hydrazine and substitution products thereof, the substituents being aliphatic hydrocarbon radicals.

6. The method of preserving rubber which comprises treating rubber with tetraphenyl hydrazine.

7. The method of preserving rubber which comprises incorporating tetraphenyl hydrazine into rubber before vulcanization.

8. The method of manufacturing an age-resisting rubber product which comprises incorporating a tetra-aryl hydrazine into a vulcanizable rubber composition, and vulcanizing the composition.

9. An age-resisting rubber product comprising rubber and a tetra-substituted hydrazine.

10. An age-resisting rubber product comprising rubber and a tetra-substituted hydrazine, the substituent groups comprising aromatic nuclei.

11. An age-resisting rubber composition comprising rubber and a tetra-aryl hydrazine.

12. An age-resisting rubber composition comprising rubber and a substance selected from the class comprising tetraphenyl hydrazine and substitution products thereof.

13. An age-resisting rubber composition comprising a substance selected from the class comprising tetraphenyl hydrazine and substitution products thereof, the substituents being aliphatic hydrocarbon radicals.

14. An age-resisting rubber composition comprising tetraphenyl hydrazine.

15. An age-resisting rubber product resulting from the vulcanization of a composition comprising rubber, sulphur, an accelerator, and a tetra-substituted hydrazine.

16. An age-resisting rubber product resulting from the vulcanization of a composition comprising rubber, sulphur, an accelerator, and a tetra-aryl hydrazine.

17. An age-resisting rubber product resulting from the vulcanization of a composition comprising rubber, sulphur, an accelerator, and tetraphenyl hydrazine.

In witness whereof I have hereunto set my hand this 17th day of January, 1929.

PAUL C. JONES.